March 26, 1929. T. H. EICKHOFF 1,706,603
SCALE
Filed Feb. 2, 1928
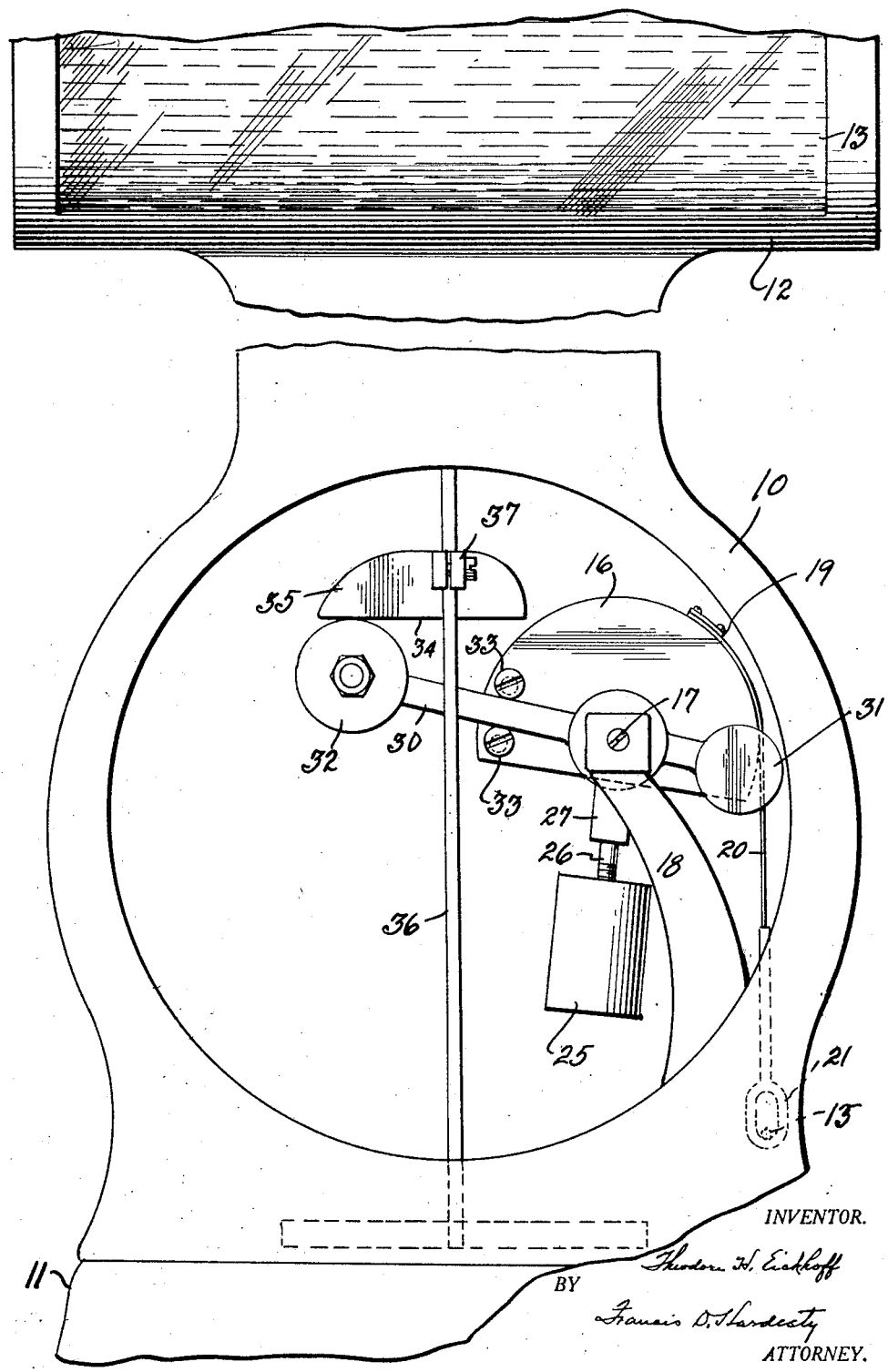
INVENTOR.
Theodore H. Eickhoff
BY
Francis D. Hardesty
ATTORNEY.

Patented Mar. 26, 1929.

1,706,603

UNITED STATES PATENT OFFICE.

THEODORE H. EICKHOFF, OF CLEVELAND, OHIO, ASSIGNOR TO THE STANDARD COMPUTING SCALE COMPANY, OF DETROIT, MICHIGAN, A CORPORATION OF MICHIGAN.

SCALE.

Application filed February 2, 1928. Serial No. 251,271.

The present invention relates to scales and more particularly to computing scales, and means for actuating the chart-carrying and weight-indicating means.

Among the objects of the invention is to simplify the actuating mechanism and to provide means which will permit the even spacing of the indications on the chart.

Another object is actuating means which permits of a more rugged construction and therefore one less apt to be injured by rough usage.

Other objects will readily occur to those skilled in the art on reference to the following description and accompanying drawing, in which:—

The figure is a view in elevation of the chart actuating means forming the preferred embodiment of the invention.

In the drawing, a suitable frame is indicated at 10 mounted on the base 11 which carries a platform, not shown, and under which is the usual complement of weighing levers. Upon the upper end of frame 11 is mounted, in the form shown, a drum casing 12 housing a cylindrical drum 13 upon which is the chart showing the weight indications.

The form of indicating drum and its mounting in housing 12 may be conventional, as may also be the weighing levers supporting and actuated by the platform above mentioned. In the latter, however, it is preferred to provide a lever having one end extending to the rear of the scale into the frame work 10 and adapted to be moved downward by the load upon the platform. The end of such a lever is shown at 15. This lever is the indicator actuating lever and is adapted to cause movement of the parts to be described, which in turn actuate the drum 13.

The actuating parts mentioned consist of a circular block 16 carried by a concentric shaft 17 supported in bearings upon a suitable frame member 18. This block 16 has attached to its periphery, as at 19, a strap or wire 20 having at its lower end a stirrup 21 supporting the end of lever 15.

Also secured to block 16 is a pendulum 25 carried upon a threaded arm 26 which is fixed in a boss 27 extending radially from the lower side of block 16. Through the threaded arm 26, the position of pendulum 25, with respect to the block, can be adjusted.

Also carried on shaft 17 is a lever 30 having at one end a counterweight 31 and at the other end a roller 32. This lever is adapted to act with block 16 as though it were made integral therewith but is angularly adjustable with respect to the block through the two eccentric screws 33.

The roller 32 is adapted to coact with the under surface 34 of a track member 35 which is carried upon a rod 36, which rod has at its upper end the conventional rack member adapted to rotate drum 13. Under surface or track 34 on member 35, is adjusted to a horizontal position with respect to the scale and the member 35 is fixed adjustably to rod 36 by means of a clamp 37, while suitable guides will be provided to compel movement of the rod 36 only in a vertical direction.

The operation of the present device would seem obvious in view of the foregoing description and will not be described in detail, further, than to say that downward movement of lever 15 causes partial rotation of block 16 and thereby the elevation of the roller end of lever 30 with consequent upward movement of rod 36 which, of course, rotates the drum to the proper point, the movement being resisted by pendulum 25.

Now having described the invention and the preferred form of embodiment thereof, it is to be understood that the said invention is to be limited not to the specific details herein set forth and illustrated, but only by the scope of the claims which follow.

I claim:

1. In a computing scale, a drum having a chart thereon, an element for rotating said drum, a weighing lever, a flexible member supporting a free end of said lever, a circular block having said flexible member secured to its peripheral surface and mounted for rotation, an arm carried by said block and angularly adjustable with respect thereto, a roller carried by said arm, and a track member for said roller carried upon said drum rotating element and a pendulum member on said block.

2. In a computing scale, a drum having a chart thereon, an element for rotating said drum, a weighing lever, a flexible member supporting a free end of said lever, a circular block having said flexible member secured to its peripheral surface and mounted for rotation, an arm carried by said block, a roller carried by said arm, and a track member for said roller carried upon said drum rotating element, and a pendulum member on said block.

THEODORE H. EICKHOFF.